United States Patent [19]

Taylor

[11] Patent Number: 4,803,473
[45] Date of Patent: Feb. 7, 1989

[54] TRANSMITTER COVER

[75] Inventor: Stephen C. Taylor, Mississauga, Canada

[73] Assignee: Dicon Systems Limited, Toronto, Canada

[21] Appl. No.: 145,928

[22] Filed: Jan. 20, 1988

[30] Foreign Application Priority Data

Nov. 9, 1987 [CA] Canada .................................. 551371

[51] Int. Cl.⁴ ............................................. G08B 23/00
[52] U.S. Cl. .................................... 340/693; 455/128; 455/90; 455/347; 455/351
[58] Field of Search .................. 340/693; 455/90, 100, 455/128, 347, 351; 312/7.1; 361/390, 394

[56] References Cited

U.S. PATENT DOCUMENTS

| | | | |
|---|---|---|---|
| 3,631,994 | 1/1972 | Mackzum, Jr. | 455/351 |
| 4,299,344 | 11/1981 | Yamashita et al. | 312/7.1 |
| 4,325,142 | 4/1982 | Nakazawa | 455/351 |
| 4,658,439 | 4/1987 | Danielsen et al. | 455/90 |

Primary Examiner—Joseph A. Orsino
Assistant Examiner—Anh H. Tran
Attorney, Agent, or Firm—Lee & Smith

[57] ABSTRACT

A display case for receiving a transmitter module and retaining the module in place is used in a security system which detects and monitors fire, burglary, emergencies, appliance failure and the like. Transmitter modules, which are placed at each of the sensors, transmit information to a central monitor. The display case for receiving the transmitter module is designed to present the module in open view so that the user can readily discern that the transmitter is in place. The display case cover includes provision to expose the transmitter while engaging the transmitter body to hold it in place in the display case.

6 Claims, 3 Drawing Sheets

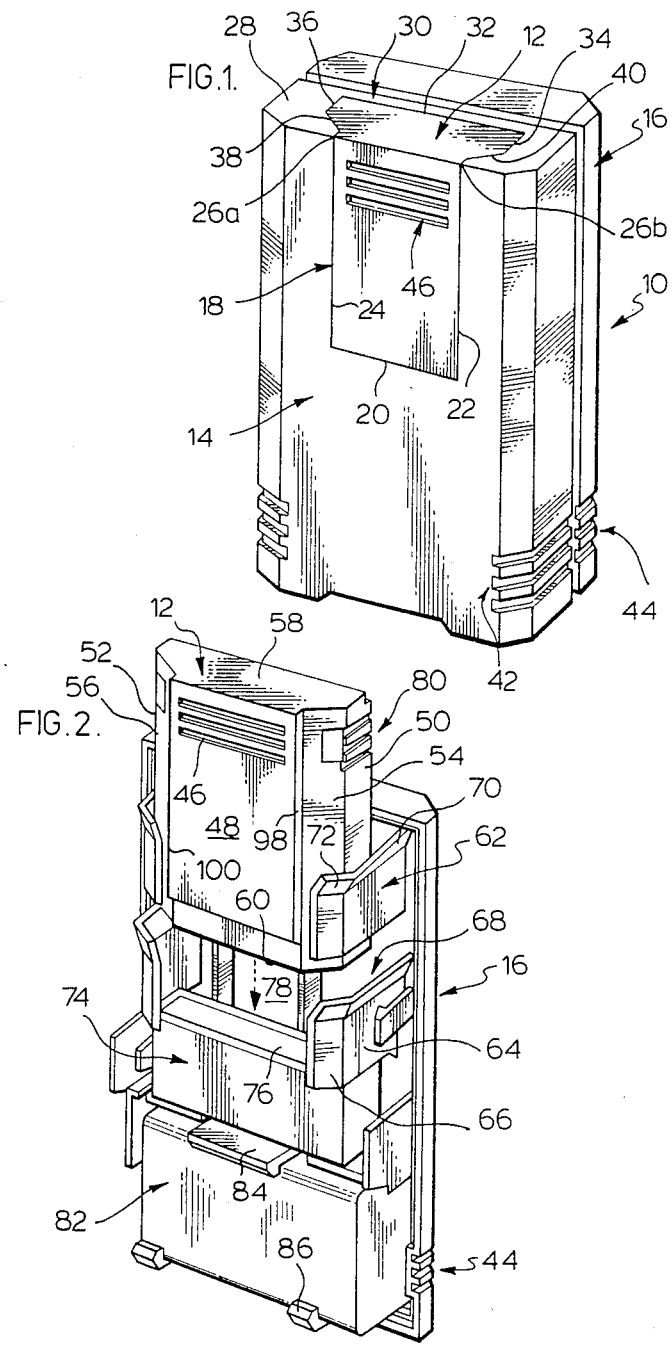

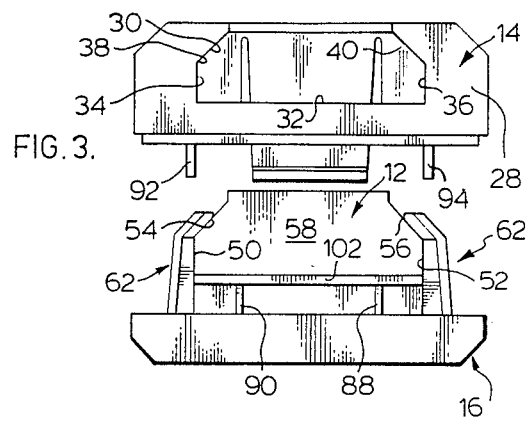
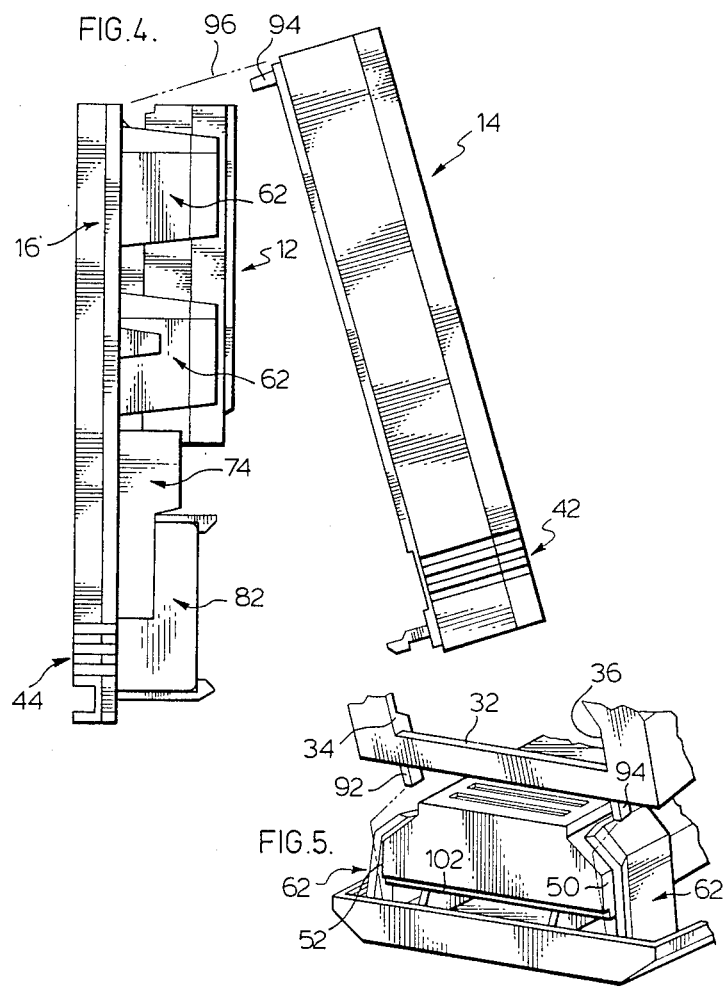

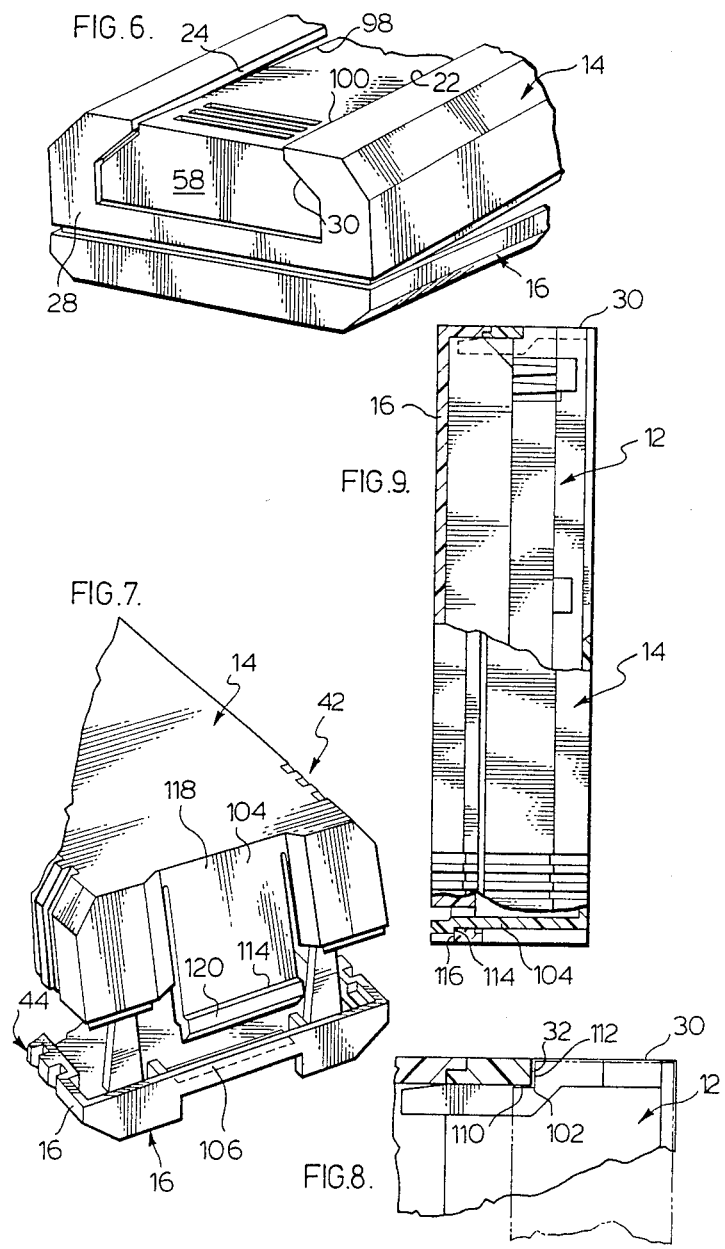

TRANSMITTER COVER

FIELD OF THE INVENTION

This invention relates to a display case for transmitter modules used in security systems.

BACKGROUND OF THE INVENTION

Security systems, which involve the use of transmitters for transmitting in a wireless system information from sensors to a central monitor, are becoming increasingly popular in residential communities. An example of such a system is disclosed in U.S. Pat. No. 4,581,606. In that system, the transmitter is coded with information by a programming unit, removed from the programmer and inserted in the particular sensor. The particular sensor, when it goes into an alarm condition, causes a transmitter to transmit an appropriate message to the central monitor to advise of the problem or status of the sensor.

Routinely, this type of transmitter is mounted within the sensor and totally covered. Hence, the user cannot discern whether or not the transmitter is placed within the sensor. If for whatever reason the transmitter is removed from the sensor without the user knowing, the breakdown in the system could go undetected for days or weeks.

SUMMARY OF THE INVENTION

In accordance with an aspect of this invention, a display case for receiving a transmitter module and retaining the module in place is designed for use in a security system. The display case houses one of many types of sensors or controllers, such as a fire detector, door/window open sensor, intrusion detector, emergency alert, appliance failure sensor and the like. The transmitter module has a generally rectangular-shaped body portion with front and rear faces, opposing sides and opposing ends. The case has separable case front and case back. The case front has a rectangular-shaped opening provided in its front face as defined by the opening edges of the case front. The opening edges are dimensioned to frame the rectangular-shaped front face of the transmitter module and thereby expose the transmitter module front face. Such presentation indicates the existence of the module in the case. The case has means for retaining the module in the case and means for releasably fastening the case front to the case back.

BRIEF DESCRIPTION OF THE DRAWINGS

Preferred embodiments of the invention are shown in the drawings wherein:

FIG. 1 is a perspective view of the display case with transmitter in prominent display:

FIG. 2 is a perspective view of the case back with the transmitter being inserted therein;

FIG. 3 is an edge view of the display case in the exploded position;

FIG. 4 is a side view of the display case showing positioning or the case front on the case back;

FIG. 5 is an end view of the display case showing positioning of one end of the front onto the back;

FIG. 6 is an end view of the display case with the front edge assembled to the back edge;

FIG. 7 is an end view of the other end of the display case with the front cover in a position to be snapped onto the back;

FIG. 8 is a section showing the interaction of the case front with the body portion of the transmitter; and FIG. 9 is a side elevation of the assembled display case with portions thereof removed to show internal details.

DETAILED DESCRIPTION OF THE PREFERRED EMBODIMENTS

With reference to FIG. 1, a display case 10 has a transmitter module 12 provided therein. The display case has a case front 14 and a case back 16. The display case 10 may be used to house a type of security sensor, such as a fire detector, door/window open sensor, intrusion detector which may be of the passive infrared type, emergency alert device or appliance failure sensor. Various devices, not shown, may be provided on the display case back 16 to enable mounting of the display case in the appropriate position. The display case front 14 is designed to provide a generally rectangular-shaped opening 18 which is defined by the opening edges 20, 22 and 24 of the case front. The upper edge of the opening 18 is defined by an imaginary line spanning the edge portions 26a and 26b of the front cover. In accordance with a preferred embodiment of the invention, the opening 18 extends downwardly of the upper edge 28 to define a truncated pentagon-shaped opening 30 having a base edge 32, opposing side edges 34 and 36 and sloping upper edges 38 and 40.

The case front and back may include the decorative grill work 42 and 44 as shown. In addition, decorative grill work 46 may be provided on the face of the transmitter 12. Such grill work also includes a functional aspect of providing a gripping surface for use in assembly and disassembly of the display case.

With reference to FIG. 2, positioning of the transmitter module 12 is shown. Transmitter module 12 is generally of rectangular shape having a front face 48 with opposing sides 50 and 52. Sloping inwardly from sides 50 and 52 are slanted surfaces 54 and 56. The upper end of the transmitter module is indicated at 58, whereas the lower end is at 60.

A retaining device is provided for retaining the transmitter module in place. In accordance with a preferred embodiment of this invention, the retaining device comprises four upstanding clips each generally designated 62. Each clip 62 is integral with the cover base 16. The clip 62 has an upstanding portion 64 with an inwardly angled ledge portion 66. Each clip 62 includes a lead-in portion generally designated 68 and consisting of outwardly angled flange members 70 and 72. When the transmitter module in inserted in the retaining device, the lead-in portion 68 of the clip 62 guides insertion so that the opposing sides 50 and 52 slide along the inner surfaces of the upright portions 64. Correspondingly the sloping faces 54, 56 of the module slide along the inside surfaces of the angled flange portion 66.

At the lower region of the retaining device, i.e., beneath clip 62, is an electrical socket connector 74 within which electrical connectors are positioned in the space 76. Internally of the lower end 60 are suitable electrical prongs for insertion in the socket. The retaining device 62 in the form of the clip guides insertion of the transmitter module 12 in the direction of arrow 78 such that the prongs at the lower end of the transmitter module are inserted into the contacts of the socket cavity 76. To assist in gripping of the transmitter module during insertion and withdrawal, suitable grips 80 are provided in the upper region of the sides 50 and 52 of the module.

When the prongs of the module are fully seated in the socket 74, the positioning of the transmitter module on the case base is determined. The purpose of the display case cover 14 is then to lock the module in place as it is seated and retained in the socket. Beneath the socket 74 is a dry cell battery 82 for powering the electronic circuitry behind the socket 74 for operation of the sensor device. Clips, such as shown at 84 and 86, may be used to hold the battery in place.

As shown in FIG. 3, to ensure that the surfaces 54 and 56 and sides 50 and 52 contact the inner surfaces of the clips 62, guide rails 88 and 90 are provided to elevate transmitter module 12 to beneath and snugly contacting the inner surfaces of the clip 62. The clip 62 and the rails 88 and 90 are all integral with the display case face 16. The case front 14 has spaced-apart legs 92 and 94 depending from the end 28 of the case front to guide the insertion of the first end of the display case into the case base 16. Such depending guides 92 and 94 ensure alignment of the opening 30 with the end 58 of the transmitter module during assembly of the sensor unit.

As shown in FIG. 4, the case front 14 is slightly tilted in assembling the front to the base 16. The end of the front carrying the guide legs 92 and 94 is moved generally in the direction of the line 96 so that the depending legs 92 and 94 may be located on each inside surface of the clips. The opening 30 in the end 28 and the front face accommodates the size of the transmitter. With reference to FIG. 2, the front 48 of the transmitter is defined by upper and lower edges 58 and 60 and nominal ledge portions 98 and 100. As shown in more detail in FIG. 5, the guide pins 92 and 94 on the front cover end 28 are positioned on the inside surfaces of the opposing clips 62. The edge 32 for the opening 30 fits within a recessed edge portion 102 of the transmitter. Opposing edges 34 and 36 of the opening engage the upper side edge portions 50 and 52 of the transmitter 12. Similarly, the edges 38 and 40 engage the upper sloping edge portions 54 and 56 of the transmitter. As shown in FIG. 6 with the case front 14 pivoted at its end 28 towards the case base 16, the opening 30 as defined by its edges begins to assume the outline of the end 58 of the transmitter module. Also the opposing edges 22 and 24 of the opening lie along side the edges 98 and 100 of the transmitter.

By continued movement of the case cover 14 towards the base 16, a detent 104 fits within the opening 106 shown in dot. The detent 104 acts as part of the fastening device for holding the cover 14 fastened to the base 16. With the cover snapped in place on the base 16, as shown in FIG. 8, the edge 32 of the opening 30 engages the recess 102 in the transmitter module 12. The edge 32 abuts a first face 110 in the recess and also a second face 112 in the recess where the recess extends the length of the underside of the transmitter module as shown in FIG. 5.

As shown in FIG. 9, the detent 104 has catch portion 114 beneath edge 116 of the opening 106. The transmitter 12 is prevented from sliding out through the opening 30, because of the interference of the first face 110 of the recess 102 with the edge portion 32. Hence the transmitter is retained in the electrical socket 74. One end of the case front 14 is prevented from being pulled away from the case back 16 by the detent 104. The other end of the case front 14 is prevented from being pulled away from the case back 16 by the interference of the edge 32 with the second face 112 of the recess 102. In an attempt to pull outwardly on the case front 14 by engaging of edge 32 with the underside of the transmitter, engagement between the sloped faces 54 and 56 with the corresponding flanges 66 of the clip 62 retain the front cover in place. Hence the recessed portion 102 in the transmitter module serves a dual role in preventing longitudinal movement of the module out of the electrical socket 74 and secondly, prevents outward movement of the case front 14 away from the case back 16. Hence the interrelationship and engagement of the cover with the transmitter provides for a securing of the front case to the back case, while at the same time providing a very convenient and attractive presentation of the transmitter module in the face of the case front as shown in FIG. 1.

It is appreciated that the display case and the transmitter module may be formed of suitable plastics material. The clips 62, which are integral with the case base in being formed of a suitable plastic, provide the necessary degree of flexibility to provide for insertion and gripping of the transmitter module. Similarly, the integral detent portion 104 with the case front 14 gives the necessary spring action at the base 118 to allow the stepped portion 120 to pass beneath the edge defining the opening 106.

It is appreciated that the opening 18 for the transmitter module may be provided solely in the front face of the case front 14. In this manner, just the upper surface of the transmitter module would be exposed and as such would indicate to the user the presence of the module in the sensor unit. However, with the aspect of showing also the end portion of the transmitter module as shown in FIG. 1, a dual purpose interaction between the module, the retaining clips and the cover is achieved to fasten the unit in the closed position when the display case is fully assembled.

Although preferred embodiments of the invention have been described herein in detail, it will be understood by those skilled in the art that variations may be made thereto without departing from the spirit of the invention or the scope of the appended claims.

I claim:

1. A display case for receiving a transmitter module and retaining said module in place, said display case being used in a security system and housing one of many types of sensors or controllers such as fire detectors, door/window open sensors, intrusion detectors, emergency alerts, appliance failure sensors and the like, said transmitter module having a generally rectangular-shaped body portion with front and rear faces, opposing sides and opposing ends, said case having separable case front and case back, said case front having a rectangular-shaped opening provided in its front face as defined by opening edges of said case front, said opening edges being dimensioned to frame said front face of said transmitter module and thereby expose said transmitter module front face through the case front to indicate presence of said module in said case, said case having means for retaining said module in said case and means for releasably fastening said case front to said case back.

2. A display case of claim 1, wherein said retaining means for said transmitter module comprises a plurality of clips extending upwardly from and secured to said case back, said plurality of clips grasping said transmitter module to retain said module in place within said rectangular-shaped opening of said case front.

3. A display case of claim 2, wherein said sides of said transmitter module have longitudinally extending sloping side portions, said clips of said retaining means slidably receiving said module as said clips overlap said sloping side portions.

4. A display case of claim 3, wherein mating electrical contact terminals are presented on transmitter module and on said case back, a mating portion of said electrical contact terminals for said case base being positioned at a lower end of said clips for receiving said module whereby sliding of said module into said clips interconnects said mating electrical contact terminals and defines a stop position for said module on said case back.

5. A display case of claim 4, wherein said rectangular-shaped opening in said case front extends to an upper edge of said case front and extends down a portion of an upper end of said case front to define a ledge along an opening edge in said upper end of said case front, said transmitter module having a recess across an upper end thereof at a corner of the junction of said upper end and said rear face of said module, said ledge engaging said recess when said case front is fastened by said fastening means to said case back, said ledge engaging said recess for blocking sliding withdrawal of said module from said clips and separation of said case front from said case back with said module held in place by said clips, said ledge retaining said mating electrical contact terminals in contact.

6. A display case of claim 5, wherein said case includes a base, and said case front has means at said upper edge for guiding placement of said ledge into said recess of said transmitter module, a lower edge of said case front having a releasable catch portion for engaging a mating catch portion on said case base to fasten said case front to said case base.

* * * * *